(12) United States Patent
Zhu et al.

(10) Patent No.: US 11,194,082 B2
(45) Date of Patent: Dec. 7, 2021

(54) ULTRA-COMPACT, ABERRATION CORRECTED, VISIBLE CHIRAL SPECTROMETER WITH META-LENSES

(71) Applicant: PRESIDENT AND FELLOWS OF HARVARD COLLEGE, Cambridge, MA (US)

(72) Inventors: Alexander Yutong Zhu, Cambridge, MA (US); Wei-Ting Chen, Cambridge, MA (US); Mohammadreza Khorasaninejad, Cambridge, MA (US); Jaewon Oh, Cambridge, MA (US); Muhammad Aun Abbas Zaidi, Cambridge, MA (US); Robert C. Devlin, Cambridge, MA (US); Federico Capasso, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 161 days.

(21) Appl. No.: 16/471,549

(22) PCT Filed: Dec. 19, 2017

(86) PCT No.: PCT/US2017/067411
§ 371 (c)(1),
(2) Date: Jun. 19, 2019

(87) PCT Pub. No.: WO2018/118984
PCT Pub. Date: Jun. 28, 2018

(65) Prior Publication Data
US 2021/0132272 A1    May 6, 2021

Related U.S. Application Data

(60) Provisional application No. 62/436,954, filed on Dec. 20, 2016.

(51) Int. Cl.
*G02B 5/18* (2006.01)
*G01J 3/02* (2006.01)
(Continued)

(52) U.S. Cl.
CPC .......... *G02B 5/1861* (2013.01); *G01J 3/0208* (2013.01); *G01J 3/0224* (2013.01); *G01J 3/2823* (2013.01); *G02B 3/0043* (2013.01)

(58) Field of Classification Search
CPC ..................................................... G02B 5/1861
(Continued)

(56) References Cited

U.S. PATENT DOCUMENTS 8,681,428 B1    3/2014    Brown
10,883,799 B1*  1/2021    Ni ............................. F41H 3/02
(Continued)

OTHER PUBLICATIONS

International Search Report and Written Opinion for International Patent Application No. PCT/US2017/067411, dated Mar. 9, 2018, 10 pages.

*Primary Examiner* — Tarifur R Chowdhury
*Assistant Examiner* — Omar H Nixon
(74) *Attorney, Agent, or Firm* — Foley & Lardner LLP

(57) ABSTRACT

An optical device includes: (1) a substrate; and (2) multiple meta-lenses disposed on the substrate, each meta-lens of the meta-lenses including multiple nanofins disposed on a respective region of the substrate, the nanofins together specifying a phase profile of the meta-lens.

18 Claims, 14 Drawing Sheets

Off-axis Meta-lens

(51) Int. Cl.
  *G01J 3/28* (2006.01)
  *G02B 3/00* (2006.01)
(58) Field of Classification Search
  USPC .......................................................... 356/302
  See application file for complete search history.

(56) References Cited

U.S. PATENT DOCUMENTS

| | | |
|---|---|---|
| 2005/0161589 A1 | 7/2005 | Kim et al. |
| 2006/0280504 A1* | 12/2006 | Wang ........................ G02B 1/00 398/138 |
| 2009/0219623 A1 | 9/2009 | Shalaev et al. |
| 2010/0025387 A1 | 2/2010 | Arai et al. |
| 2010/0033701 A1* | 2/2010 | Lee ..................... G03F 7/70341 355/67 |
| 2011/0188032 A1* | 8/2011 | Verma .................... G01N 21/00 356/237.2 |
| 2011/0204891 A1* | 8/2011 | Drake .................... G01R 33/36 324/309 |
| 2011/0206291 A1 | 8/2011 | Kashani et al. |
| 2012/0328240 A1* | 12/2012 | Ma ......................... G02B 1/002 385/33 |
| 2013/0258490 A1 | 10/2013 | Ishihara |
| 2013/0278747 A1 | 10/2013 | Yang |
| 2014/0374268 A1* | 12/2014 | Wu .......................... C25D 1/04 205/118 |
| 2014/0378818 A1* | 12/2014 | Drake .................... A61B 18/04 600/411 |
| 2015/0260812 A1* | 9/2015 | Drake .................. G01R 33/441 324/307 |
| 2015/0309473 A1* | 10/2015 | Spadaccini ........... B29C 64/135 359/3 |
| 2016/0025914 A1 | 1/2016 | Brongersma et al. |
| 2016/0306079 A1* | 10/2016 | Arbabi ............... G02B 27/0025 |
| 2017/0082263 A1* | 3/2017 | Byrnes ................... G02B 1/005 |
| 2017/0146806 A1* | 5/2017 | Lin ...................... G02B 21/367 |
| 2019/0154877 A1* | 5/2019 | Capasso .................. G02B 1/00 |
| 2020/0157437 A1* | 5/2020 | Kumar ................. C10G 25/006 |

* cited by examiner

Dispersive Meta-lens

$$|\Delta \vec{r}| = \sqrt{\Delta f^2 + (f \Delta \alpha)^2}$$

Off-axis Meta-lens

Typical Spectrometer

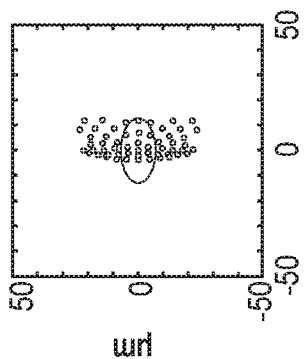
FIG. 5B
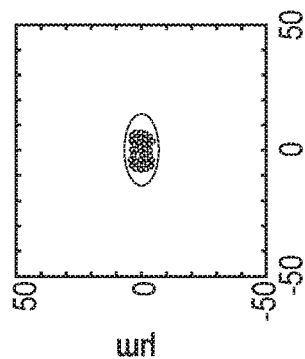
FIG. 5C
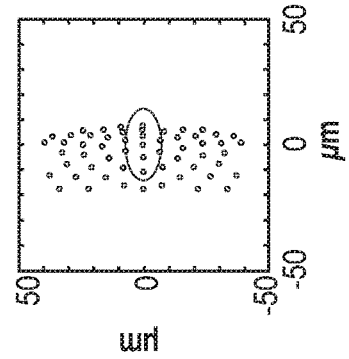
FIG. 5D
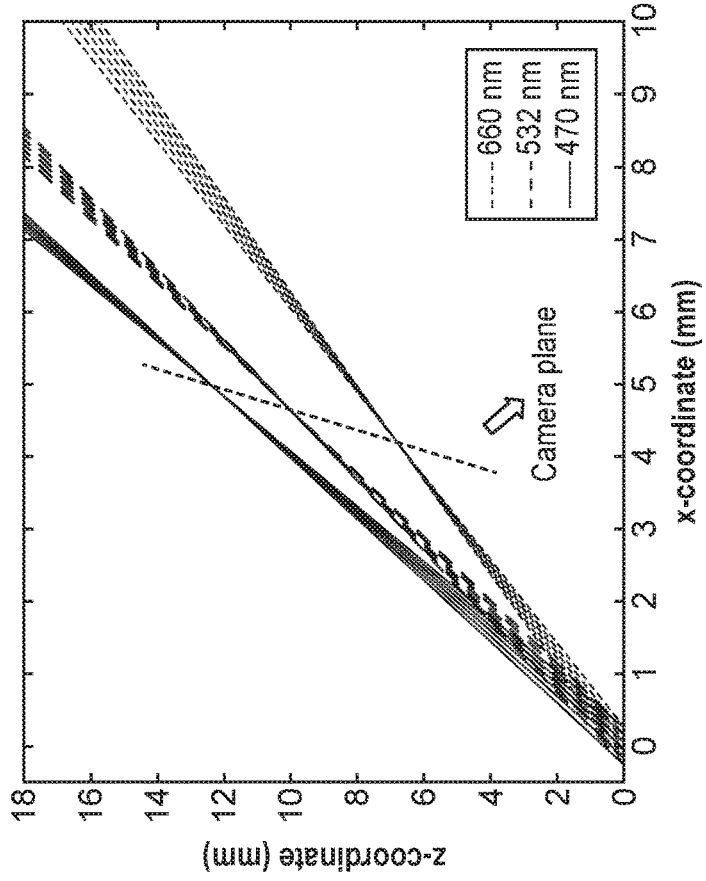
FIG. 5A
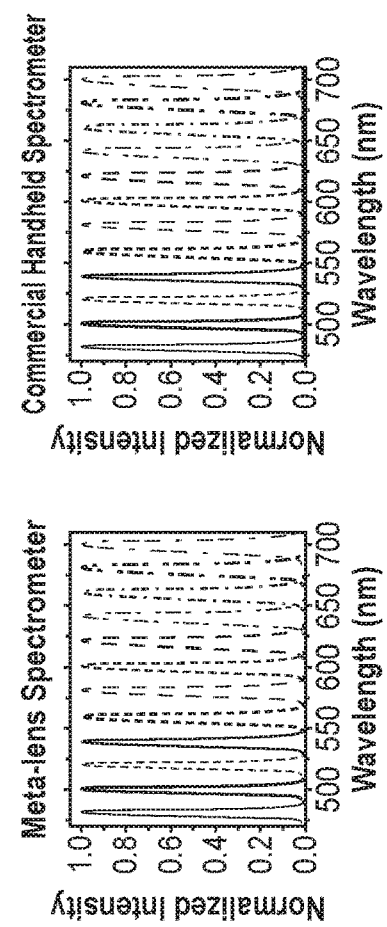
FIG. 5G
FIG. 5F
FIG. 5E

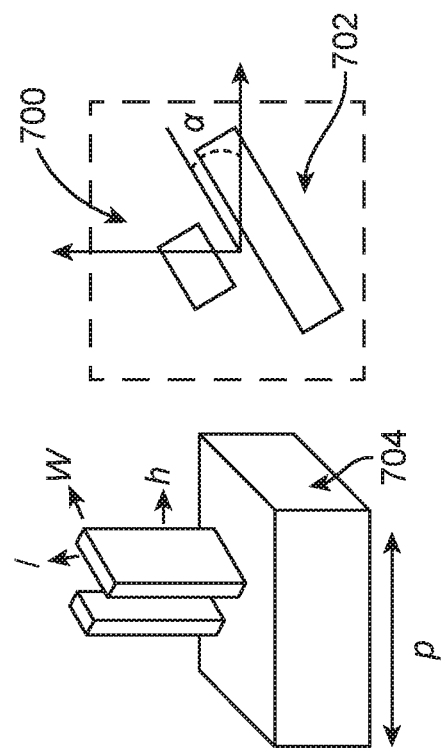
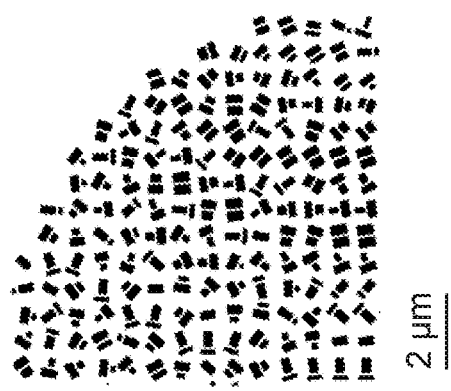
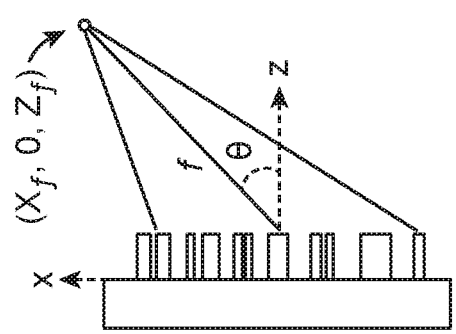
FIG. 7A
FIG. 7B
FIG. 7C

ULTRA-COMPACT, ABERRATION CORRECTED, VISIBLE CHIRAL SPECTROMETER WITH META-LENSES

CROSS-REFERENCE TO RELATED APPLICATION

This application is a National Stage Entry of International Application No. PCT/US2017/067411, filed Dec. 19, 2017, which claims the benefit of and priority to U.S. Provisional Application No. 62/436,954, filed Dec. 20, 2016, the contents of which are incorporated herein by reference in their entireties.

STATEMENT OF FEDERALLY SPONSORED RESEARCH OR DEVELOPMENT

This invention was made with Government support under FA9550-14-1-0389 and FA9550-16-1-0156, awarded by the Air Force Office of Scientific Research. The Government has certain rights in the invention.

BACKGROUND

Recent advances in nanoscience have led to the development of technologies for diverse areas of applications, ranging from disease diagnostics to environmental monitoring and energy storage. Its broad appeal is centered on three aspects: improvement in performance, miniaturization and reduction of system complexity, and addition of functionalities. In the context of optics, the development of metasurfaces comprised of subwavelength scatterers at an interface has given rise to an impressive host of applications ranging from planar lenses, holograms, beam deflectors, to even cloaking and analog computing devices.

On a system level, a basic component for many optical instruments is a spectrometer. The ability to decode changes to the spectrum of light in response to external stimuli is central to applications such as environmental monitoring of pollutants and the detection of specific antibodies in disease diagnostics. Furthermore, advanced techniques such as circular dichroism spectroscopy are widely used to obtain additional circular polarization (CP) information to distinguish between optical isomers during the manufacture of many pharmaceutics and agrochemicals.

Typical approaches to acquire spectral and polarization information involve cascading multiple components such as non-polarizing beamsplitters, waveplates and polarizers, or composite prisms comprised of naturally birefringent crystals (e.g., Fresnel rhomb) paired with a spectrometer. These spectrometers typically include focusing mirrors and a grating turret. The spectrometers can suffer from insufficient grating dispersion to allow for large spatial separation within a short (e.g., mm to cm) light propagation distance, which places a lower limit on their physical size in order to achieve sufficient spectral resolution. Using a turret to mount gratings with different dispersions in order to tune/adjust spectral resolutions also adds significant complexity and bulkiness to the system. While handheld and miniaturized spectrometers are available, these systems are typically constrained to a single, fixed spectral resolution and lack polarimetric capabilities. Similarly, while there have been efforts to utilize metasurfaces for spectroscopy, these devices typically suffer from these same constraints or a low spectral resolution. Furthermore, current techniques have not demonstrated how aberrations may be corrected using metasurfaces—this is desired to realize aberration-free spectrometers for demanding applications.

It is against this background that a need arose to develop the embodiments described herein.

SUMMARY

Compact spectrometers typically have a fixed spectral resolution and typically cannot resolve the polarization properties of light without additional optical components, while their larger counterparts are bulky and costly. Here, some embodiments are directed to multiple off-axis meta-lenses integrated on a single planar substrate. The meta-lenses possess both focusing and strongly dispersive properties, and are designed to provide different spectral resolutions as well as different operating wavelength ranges on a same chip. A compact spectrometer is realized using these meta-lenses and a complementary metal-oxide-semiconductor (CMOS) camera, achieving detector-limited spectral resolutions as small as about 0.3 nm and a total operating wavelength range exceeding about 170 nm for a beam propagation length of just a few cm. This spectrometer also has the capability to resolve chirality in a single measurement. This chip-camera setup represents a highly compact configuration for a spectrometer, and its compatibility with large-scale fabrication processes makes it broadly applicable. In addition, it is demonstrated that higher order derivatives of phase can be specified using nanostructures, resulting in an aberration corrected spectrometer with diffraction limited focusing across a broad range of input wavelengths. Embodiments of a spectrometer are applicable for the visible range, and are generalizable to other wavelengths, such as near-infrared and mid-infrared by using different materials.

In one aspect according to some embodiments, an optical device includes: (1) a substrate; and (2) multiple meta-lenses disposed on the substrate, each meta-lens of the meta-lenses including multiple nanofins disposed on a respective region of the substrate, the nanofins together specifying a phase profile of the meta-lens.

In another aspect according to some embodiments, an optical device includes: (1) a substrate; and (2) at least one meta-lens disposed on the substrate, the meta-lens including multiple dielectric elements disposed on the substrate, the dielectric elements together specifying a phase profile and a group delay of the meta-lens such that different wavelengths of an incident beam are focused off-axis on a common image plane.

In a further aspect according to some embodiments, a spectro-polarimeter or a meta-spectrometer includes any of the foregoing optical devices and a camera adjacent to the optical device. In some embodiments, the spectro-polarimeter is configured to measure polarization and spectral information of an incident beam in a snapshot of the camera.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 5. (a) Ray tracing calculations for the low NA meta-lenses (R2 and L2 in FIG. 3(b)), which were designed for λ=about 532 nm, at wavelengths of about 470 nm, about 532 nm and about 660 nm. A plane which simultaneously intercepts the focal planes at each of these wavelengths is shown. (b)-(d) Simulated spot diagrams coded to match their corresponding wavelengths. The ideal, aberration-free Airy disks are plotted as a reference. Good focal spot quality is preserved over a large wavelength range. (e) Measured spectra from a supercontinuum laser with about 5 nm bandwidth using the meta-lens spectrometer, and (f) a commercial handheld spectrometer. The center wavelengths used varied from about 480 nm to about 700 nm in increments of about 20 nm. (g) Measured dispersion values for the NA=about 0.1 (squares) and NA=about 0.02 (circles) meta-lenses about their design wavelength of about 532 nm.

FIG. 7. (a), (b) Schematic illustrations of an aberration corrected meta-lens (AML), which focuses off-axis. Its unit cell is comprised of (c) one or two nanofins in close proximity, which allows engineering of the group delay and higher order phase derivatives.

DETAILED DESCRIPTION

It is desired to develop compact spectrometers capable of good spectral performance and chirality-resolving capabilities, namely capable of distinguishing right/left circularly polarized (RCP/LCP) light. Off-axis meta-lenses can provide high spectral resolution beyond what is achievable by conventional gratings. However, a constraint on efficiency can occur in the visible range due to intrinsic material losses; further, the capability of providing polarization information within a compact/single layer device remains a challenge. Here some embodiments are directed to off-axis meta-lenses operating at visible wavelengths with the added functionality of resolving the chirality of incident light, although additional embodiments are applicable to other wavelengths. This is realized by using a titanium oxide ($TiO_2$) atomic layer deposition (ALD) process. $TiO_2$ is substantially lossless across the visible spectrum and possesses a moderately high refractive index to provide strong light confinement. This ALD process allows the fabrication of high quality nanostructures with reduced roughness and substantially vertical sidewall profiles, which are desired to realize highly efficient metasurface devices. Other approaches of using reactive ion etching (ME) processes can constrain the steepness of the sidewall profile and aspect ratio of fabricated structures. This translates into inaccuracies in the resultant phase profile, which can be significant despite having a small amount of tapering. By integrating multiple off-axis meta-lenses with different designs (e.g., focal length, spatial size, position and focusing angle) onto a same substrate, a highly versatile ultra-compact spectrometer with variable resolution, spectral range and reduced spatial footprint can be achieved. Due to the CP sensitivity of meta-lenses based on the geometric phase, such a spectrometer is also capable of resolving chirality in a single measurement. Finally, their CMOS-compatible fabrication process is amenable to monolithic integration with camera sensors and large-scale production.

Device Design

A. Grating Design

Figure 1A:
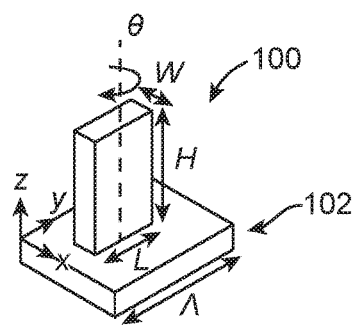
FIG. 1. (a) Schematic of a single nanofin with width W, height H, length L and unit cell size Λ on a glass substrate. These values are W=about 80 nm, H=about 600 nm, L=about 210 nm and Λ=about 250 nm for the results shown in FIG. 1(b)-(c). Each fin is rotated by an angle θ to impart the desired phase at each spatial location. Coordinate axes are specified with respect to the plane of the nanostructures. (b) Top-view scanning electron microscope (SEM) image of a meta-grating comprised of arrays of nanofins. Here each period (P=about 1 μm) comprises 4 phase levels (nanofins). Scale bar: 1 μm (c) Measured (circles) and simulated (line) efficiencies of the +1 order metasurface grating shown in (b) under illumination with right circularly polarized light. Extinction ratio (triangles) of the meta-grating as a function of wavelength is also plotted. (d) Simulated efficiencies using the same nanofin parameters (W, H, L and Λ) for different grating periods of about 1500 nm, about 1000 nm and about 750 nm, corresponding to different deflection angles of about 20°, about 30° and about 42° at about 500 nm.
Figure 1B:
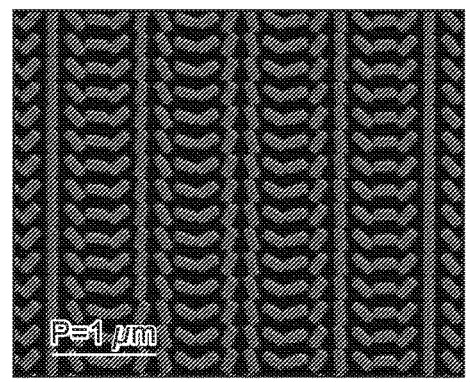
Figure 1C:
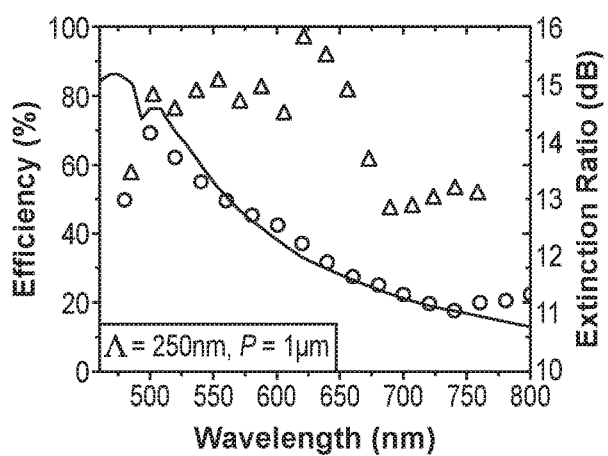
Figure 1D:
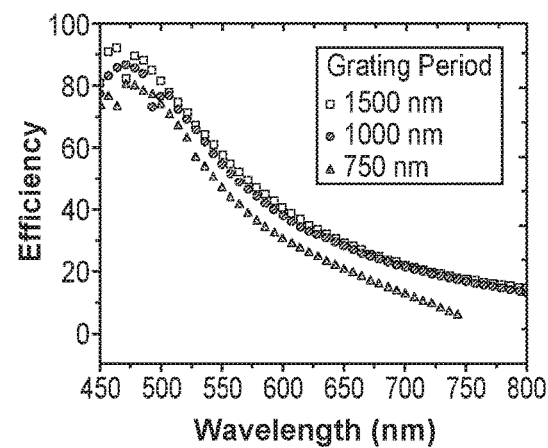

The building block of metasurface components in some embodiments is a nanostructure in the form of a $TiO_2$ nanofin 100 on a glass substrate 102 (FIG. 1(a)), which acts as a birefringent waveguide. Multiple ones of such nanofins 100 are disposed on the substrate 102. Phase control is achieved by geometric rotation of the nanofins 100, resulting in phase acquisition substantially equal to twice the rotation angle (Pancharatnam-Berry phase). The latter is accompanied by a conversion of the incident light helicity. To achieve the maximum conversion efficiency for CP incident light, namely transmitted power, each nanofin 100 is designed as a half-waveplate by adjusting its geometric parameters (width, length and height). This concept is experimentally and numerically demonstrated by first designing a meta-grating. A scanning electron microscope (SEM) image is shown in FIG. 1(b). The meta-grating diffracts the incident light into the +1 and −1 orders for RCP and LCP light, respectively. The diffraction angle follows that of a typical grating $\sin^{-1}(\lambda/P)$, where $\lambda$ is the wavelength and P is the period. Here the design wavelength for maximum conversion efficiency was determined to be about 500 nm, and the period was about 1 µm. Efficiencies as high as about 80% and extinction ratios up to about 16 dB were measured in the vicinity of the design wavelength, as shown in FIG. 1(c). A difference is observed (particularly at shorter wavelengths) between the experimental and simulated efficiency curves due to deviations in the size of the nanostructures from the intended design. This likely arises from the fabrication process, such as proximity effects during electron beam lithography, which cause the peak efficiency to be redshifted compared to the simulation. The efficiency is specified as the ratio of optical power in the desired order to that of incident light. The latter is measured after passing through an aperture of the same size as the grating (here about 250 µm×about 250 µm) on the same substrate. The extinction ratio is calculated as the ratio of measured power for two different helicities of light in the same diffracted order. Theoretically evaluation is made of the dependence of the efficiency with grating period for the same nanofin parameters, where the unit cell and nanofin sizes are kept constant (FIG. 1(d)). As expected from the Nyquist sampling criteria, with decreasing grating period (or increasing diffraction angle) the efficiency drops since there are less phase levels per period.

B. Meta-Lens Design

Figure 2A:
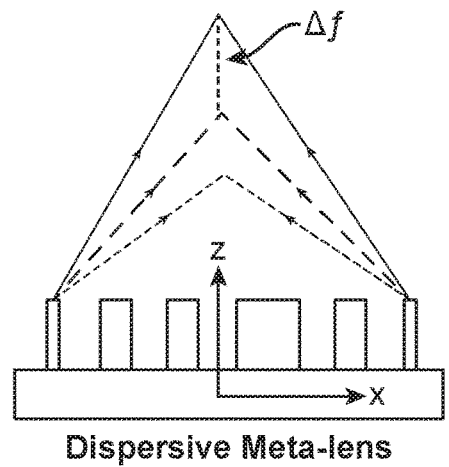
FIG. 2. (a) Schematic showing that a meta-lens whose phase profile is given by Equation (1) is chromatically dispersive, namely the focal length changes as a function of wavelength. The shading of the rays represents their respective wavelengths (red, green and blue). (b) Schematic diagram for an off-axis meta-lens. The focusing angle also changes with wavelength in addition to the longitudinal focal length shift. These changes both contribute to the transverse displacement of the focal spot $|\Delta \vec{r}|$ along a given plane. (c) Schematic illustration of operation of a typical grating spectrometer. The focusing and dispersive (grating) components are separated. By design, the focusing mirror is achromatic and light with different wavelengths are focused onto the same detector plane, with lateral displacement resulting just from the grating dispersion.
Figure 2B:
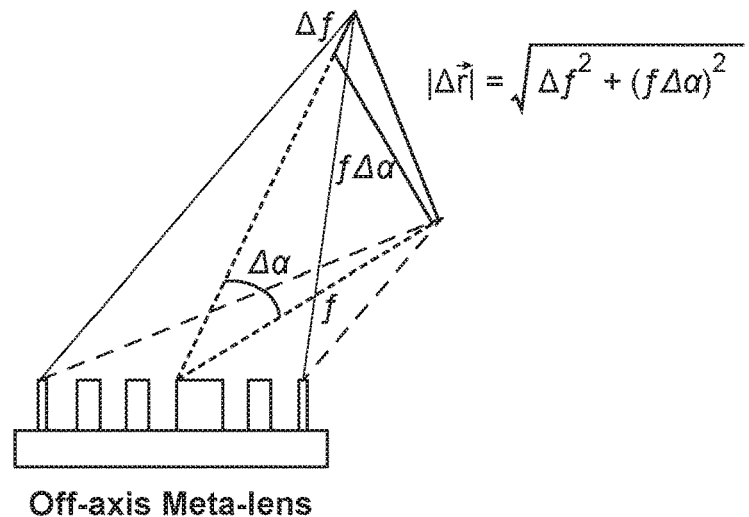

The foregoing demonstrates an efficient chiral meta-grating in the visible range. In order to enhance spectral resolution, a detector would be disposed far away from the meta-grating, which makes high resolution spectrometers bulky. The propagation distance for a given spectral resolution can be substantially reduced by focusing the light that emerges from the meta-grating. This can be achieved by imparting a hyperbolic phase profile of a lens to nanofins of a metasurface, such that incoming light of a certain wavelength is focused into a diffraction-limited spot (FIG. 2(a)). The phase at each point of the meta-lens follows:

$$\varphi(x, y) = 2\pi - \frac{2\pi}{\lambda_d}\left(\sqrt{(x-x_f)^2 + (y-y_f)^2 + z_f^2} - f\right) \quad (1)$$

where $f=\sqrt{x_f^2+y_f^2+z_f^2}$ is the focal length, and $\varphi$ and $\lambda_d$ are the specified phase and design wavelength, respectively. All coordinates and phases are specified with respect to the center nanofin (x=0, y=0, z=0). Eq. (1) compensates for the phase shifts between the varying optical paths of light originating from different positions on the meta-lens, such that constructive interference takes place at the focus ($x_f$, $y_f$, $z_f$). The method of implementation of this phase mask is again through the use of rotated nanofins whose parameters are the same to that used for the meta-grating. This rotation results in polarization conversion of the helicity of incident light and acquisition of a geometric phase equal to about twice the rotation angle. Note that for a given phase profile of a meta-lens, Eq. (1) indicates that its focal length changes strongly as a function of wavelength, namely the focal spot undergoes a longitudinal displacement Δf along the optical axis (FIG. 2(a)). In addition, one can design an off-axis meta-lens using Eq. (1) by placing the focal spot at $x_f$=f sin(α), $y_f$=0 and $z_f$=f cos(α), where α is the angle between the line from the center of meta-lens to the focal spot and the z-axis, specified as the focusing angle. When a is non-zero, a small change in the wavelength of incident light results in an additional lateral displacement of the focal spot fΔα whose magnitude is strongly dependent on both f and α. The resultant sum $|\Delta \vec{r}|$ of these displacements is shown in FIG. 2(b); its variation with wavelength can be quantified via the dispersion $|\Delta \vec{r}|/\Delta\lambda$ along an appropriately placed camera plane:

$$\frac{|\Delta \vec{r}|}{\Delta\lambda} = \sqrt{\left(\frac{\Delta f}{\Delta\lambda}\right)^2 + f^2\left(\frac{\Delta\alpha}{\Delta\lambda}\right)^2} \quad (2)$$

where Δα represents changes in the focusing angle due to a small wavelength change Δλ.

Figure 2C:
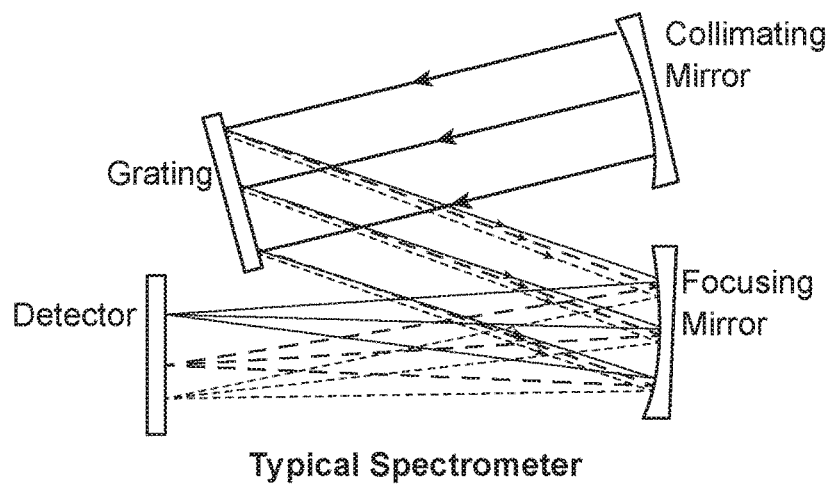

Compared to typical grating spectrometers (FIG. 2(c)) whose focusing components are achromatic due to the use of reflective optics, the aforementioned longitudinal focal length change of the off-axis meta-lenses can be exploited to further increase the dispersion of a compact spectrometer. In typical spectrometers the focal length change is negligible so that any contribution to the dispersion arises from the change in grating diffraction angle. Furthermore, in blazed gratings, the diffraction angle is constrained to about a few tens of degrees, due to shadowing effects. These factors combine to significantly constrain the dispersion that can be achieved in such spectrometers.

A minimum resolvable wavelength difference $\delta\lambda_{min}$ (spectral resolution) at the design wavelength $\lambda_d$ corresponds to a focal spot displacement given by Rayleigh criterion, namely:

$$\delta\lambda_{min} = \Delta\lambda/|\Delta\vec{r}| \times 0.61\lambda_d/NA \quad (3)$$

where $\Delta\lambda/|\Delta\vec{r}|$ is the reciprocal dispersion which can be obtained from Eq. (2) and NA is the numerical aperture of the off-axis meta-lens. However, in a spectrometer the pixel size of the camera introduces a further constraint on the spectral resolution since the pixel size specifies the sampling rate. If the pixel size is large compared to $(0.61\lambda_d/NA)\times\frac{1}{2}$, according to the Nyquist sampling theorem aliasing occurs, which mitigates against the resolving of two points in close proximity. Since in general at least three pixels are involved to distinguish two points, the final spectral resolution of the spectrometer at the design wavelength is the convolution between these two effects and can be written as:

$$\delta\lambda_{min} = \Delta\lambda/|\Delta\vec{r}| \times \frac{0.61\lambda_d}{NA} + \Delta\lambda/|\Delta\vec{r}| \times 3D/M \quad (4)$$

where D and M are the camera pixel size and magnification of the spectroscopic imaging system, respectively. From this discussion, it is evident that by tailoring the off-axis focusing angle as well as the focal length, one can achieve a desired dispersion (Eq. (2)), and hence spectral resolution, at any design wavelength using meta-lenses. However, there is a trade-off between the spectral resolution and spectral range. For a system with a fixed detector size, using a higher NA meta-lens for a higher spectral resolution results in more chromatic aberration (e.g., broadening of the focal spot size) for a given change in wavelength, which constrains the spectral range of the spectrometer. Another challenge associated with using high NA lenses is to locate a common plane where multiple wavelengths are in focus, due to the smaller depth of focus. Alternatively, one can lower the NA while increasing the dispersion to maintain similar resolution for a wider spectral range. In this case, since the dispersion is larger the area of the active region of the camera sensor can pose the constraint to the operating wavelength range.

Characterization

A. Meta-Lenses

For general spectroscopic applications, which specify a large operating wavelength range and high resolving power within a spectrum of interest, several off-axis meta-lenses are integrated on a same substrate to provide spatially separated focal spots in the same field of view of a camera. Each meta-lens possesses different spectral resolution and spectral range and selectively focuses light with opposite CP states. In this way, one can realize in a single device within an area of less than about 2 cm×about 1 cm, the functionality of multiple distinct gratings (with different wavelength ranges and resolutions), focusing lenses and CP components.

Figure 3:
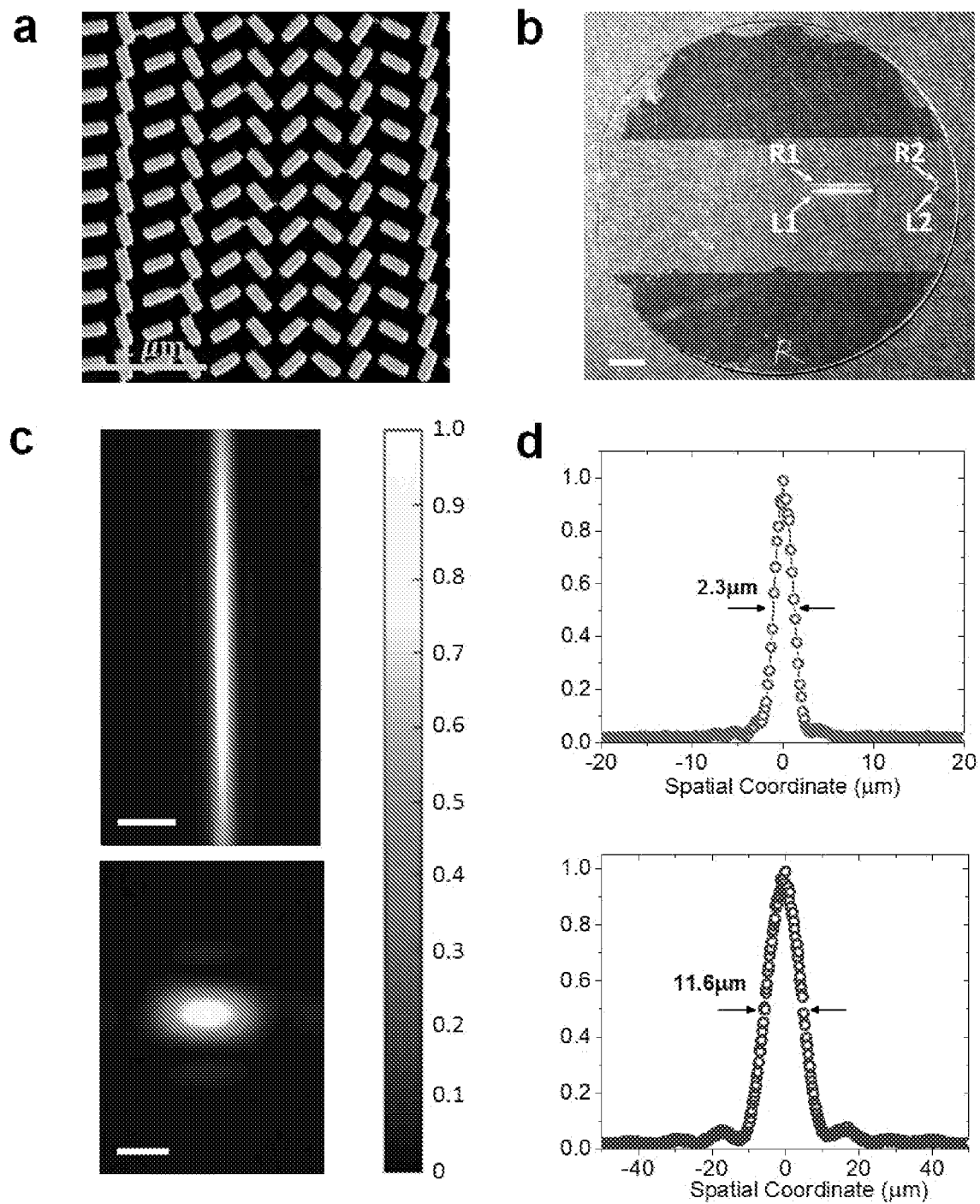
FIG. 3. (a) SEM image of a fabricated off-axis meta-lens. (b) Photograph of a fabricated device with four separate meta-lenses labeled R1, R2, L1 and L2. These meta-lenses are designed based on the phase profile in Eq. (1) but rectangular in shape to keep all focal spots within an active region of a camera. The primary focusing/dispersion direction is along the horizontal axis of the image. The letters R and L refer to the helicity of light focused by each meta-lens; 1 and 2 indicates the parameters used for the lens design. R1 and L1 have a NA of about 0.11, focusing angle α=about 60° and a focal length of about 20.1 mm, while R2 and L2 have an NA of about 0.022, focusing angle α=about 25° and a focal length of about 11.1 mm. Physical dimensions of the lenses are about 9 mm×0.1 mm (R1 and L1) and about 0.5 mm×0.8 mm (R2 and L2). Scale bar: 5 mm. (c) CMOS camera image after magnification using a 10× objective of the focal spots generated by the meta-lenses for circularly polarized incidence. The upper and bottom focal spot corresponds to meta-lens R1 and R2. Both scale bars: 25 μm (d) Horizontal cuts of the focal spots in (c), showing diffraction limited focusing.

A representative SEM image of an off-axis meta-lens is shown in FIG. 3(a). For the final device (FIG. 3(b)), four meta-lenses are fabricated: two at large (α=about 60°) focusing angles with a NA of about 0.1 for high spectral resolution (R1 and L1), and two at small focusing angles of about 25° with a NA of about 0.022 for a larger spectral range (R2 and L2). The two meta-lenses fabricated for each NA are sensitive to opposite helicities of incident circularly polarized light: as a result of the use of the geometric phase in the design, any single meta-lens would focus light of a chosen handedness while defocusing the other. Note that these meta-lenses are designed according to the phase profile specified by Eq. (1), with care taken to avoid spatial overlapping of focal spots from different meta-lenses. The final shape of the meta-lenses is rectangular instead of circular to keep the focal spots within the active region of the camera; this results in the asymmetrical shape of the focal spots. The primary focusing/dispersion direction is along the horizontal axis of FIG. 3(c).

Characterization of the focal spots is made using a narrow line width (about pm) diode laser (Quantum Optics) at the design wavelength of about 532 nm. The laser beam is coupled into a fiber, and subsequently collimated (Thorlabs RC04APC-P01) before being incident on the meta-lenses. An objective lens (Mitutoyo M Plan Apo 10×, NA of about 0.28) paired with a tube lens of focal length f=about 200 mm and a CMOS camera (Edmund EO-5012) with small pixel size of about 1.67 μm were used for accurate characterization. Measured results are in good agreement with theory: observation is made of close to diffraction limited focal spots with full-width half maximum (FWHM) of about 2.3 μm and about 11.6 μm for the high and low NA meta-lenses respectively (FIG. 3(c), (d)). Similar values were obtained for meta-lenses designed for the opposite helicity. Additionally, it is observed from FIG. 3(c) that the divergent light of opposite helicity introduces negligible background noise to the system.

B. Meta-Lens Spectrometer

Figure 4B:
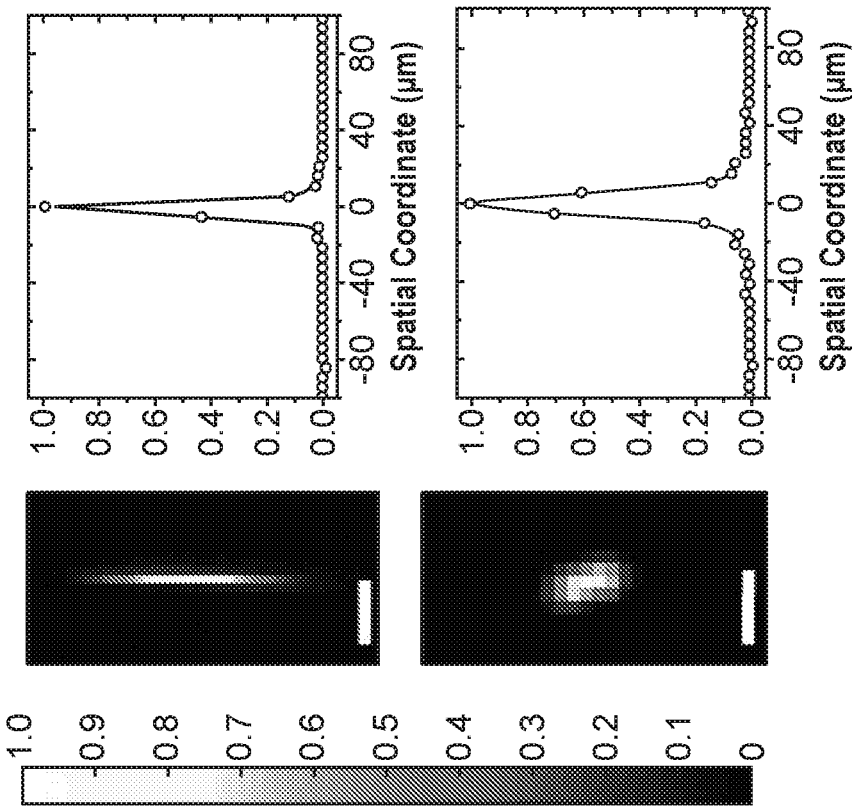
FIG. 4. (a) Photograph of a meta-spectrometer including meta-lenses and a camera. (b) Measured intensity profiles of focal spots (left) and their corresponding horizontal cuts (right) from the camera shown in (a), under linearly polarized light from a light source in the form of a diode laser at λ=about 532 nm. Top and bottom panels correspond to the focal spots of the NA=about 0.1 and NA=about 0.02 lenses respectively. Scale bars: 40 μm (top) and 30 μm (bottom).
Figure 4A:
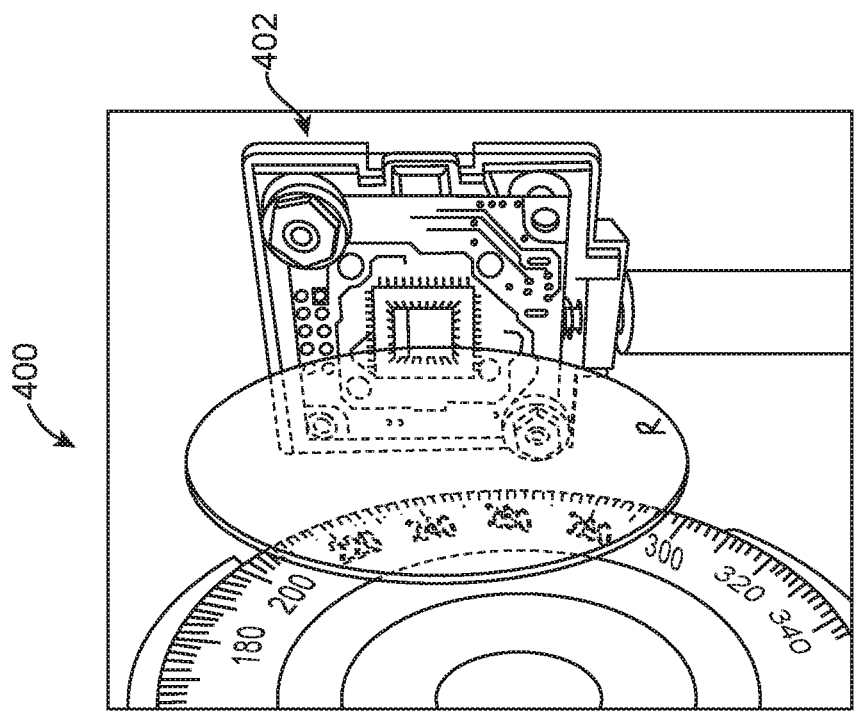

To form a compact spectrometer, meta-lenses 400 are paired with a CMOS camera 402 (Thorlabs DCC1545M) (FIG. 4(a)). It has a pixel size of about 5.2 μm and an active area of about 6.66×5.32 mm$^2$. The camera plane is placed so that the quality of the focal spots (e.g., shape and symmetry) is optimized for two distinct wavelengths (λ=about 532 nm and λ=about 660 nm). The images of the focal spots corresponding to the NA=about 0.1 and NA=about 0.02 meta-lenses under linearly polarized light at λ=about 532 nm, as well as their horizontal cuts, are shown in FIG. 4(b). Note that here the FWHM of the focal spot profiles are constrained by the camera's pixel size, in contrast to the characterization shown in FIG. 3(c).

Metasurface focusing and dispersive components may be subject to chromatic aberration. Since the specified phase profile is wavelength dependent, at wavelengths different from the design wavelength, the focal spot may be subject to aberration and its position may be shifted both laterally and longitudinally (along the focusing axis). These aberrations are more pronounced for higher NA lenses due to the smaller focal spot size. In general, in order to maintain high spectral resolution for as wide a range of wavelengths, the focal spot quality (e.g., its size and shape) should be preserved for that range. This specifies both a suitable NA in terms of lens design, as well as appropriate placement of a light detector plane such that it intersects with the focal spots within their depth of focus. Here, design is made of the small diameter meta-lenses (labelled R2 and L2 in FIG. 3(b)) for a large spectral range while maintaining a reasonable spectral resolution. Ray-tracing simulations of their performance at about 470 nm, about 532 nm and about 660 nm are shown in FIG. 5(a). These simulations provide a guideline to identify the optimal position of the camera plane for minimizing the focal spot simultaneously at different wavelengths within the operating range. This range is specified as the spectrum over which the focal spots are still close to diffraction-limited along the dispersion direction. This criterion is more stringent than typically used, but nevertheless it is found, under this criterion, that the spectral range of the meta-lenses to be almost about 200 nm.

The aforementioned focal spot sizes are computed using a commercial software OpticStudio (Zemax LLC). FIG. 5(b)-(d) show the spot diagrams corresponding to the intercept points on the camera plane (black dashed line in FIG. 5(a)) for rays passing through the meta-lens. The shading of the spots corresponds to their wavelength, namely about 470 nm (blue), about 532 nm (green) and about 660 nm (red). To visualize the spreading of the points, the ideal Airy disk at each chosen wavelength is plotted as a reference. These were calculated by using the Huygens-Fresnel principle to propagate the complex electric fields at the meta-lens to its corresponding focal plane. For wavelengths away from the design wavelength $\lambda_d$=about 532 nm, the focal plane is specified by a normal vector and a point, corresponding to the propagation direction of the chief ray (the normal vector), as well as the intersection of the chief ray and paraxial rays (the point). This criterion was used in the calculations since due to chromatic aberrations, not all rays have a common intersection at wavelengths different from the design wavelength. From FIG. 5(b)-(d), it is seen that the focal spots within about 470-660 nm lie mostly within their Airy disk along the dispersion direction. Deviations are within the pixel size of the camera (about 5.2 µm). Note that this applies to the primary focusing direction of the meta-lenses (horizontal axis in FIG. 5(b)-(d)).

Figure 9:
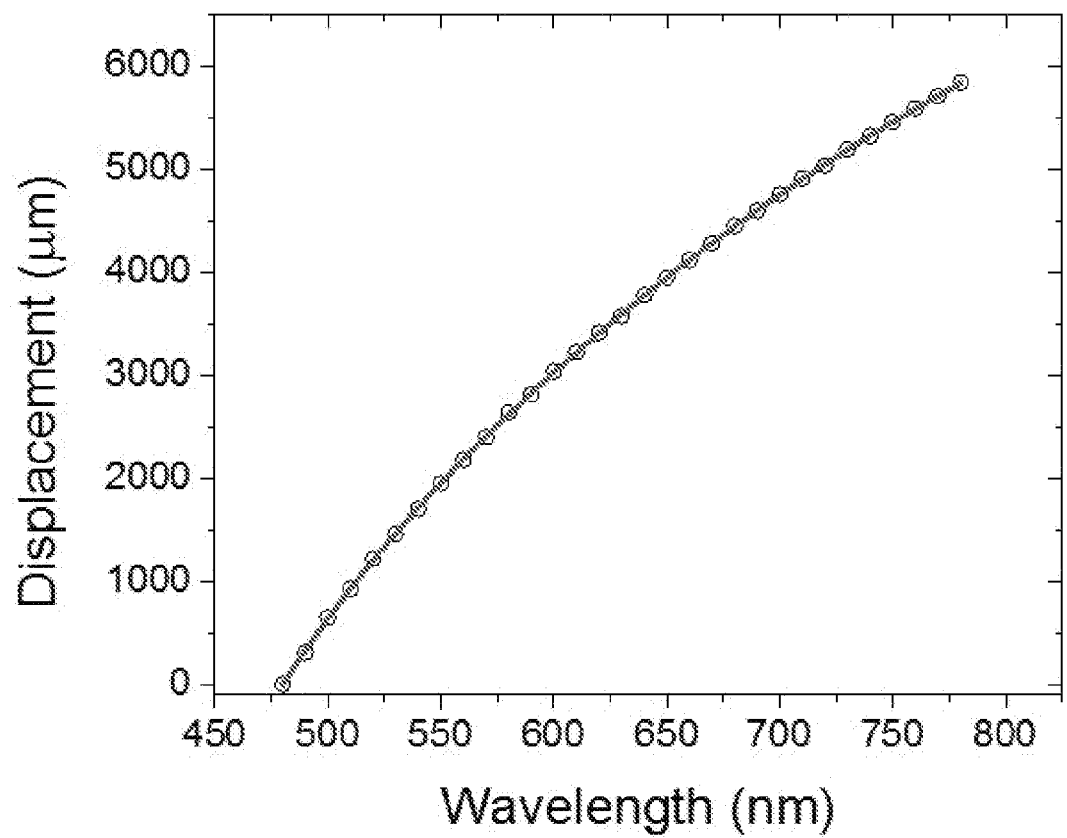
FIG. 9. Calibration curve for the NA=about 0.022 off-axis meta-lenses. Wavelengths are varied from about 480 nm to about 780 nm in steps of about 10 nm using a SuperK laser. Data points correspond to the center (highest intensity region) of the focal spots on the detector. The curve is a fitted curve using a 5th degree polynomial. This curve specifies the Δλ that each pixel of the camera corresponds to, which is used to recover the graphs shown in FIG. 5(e) and FIG. 11. Dispersions also can be obtained from the slopes of this curve at different wavelengths.
Figure 10B:
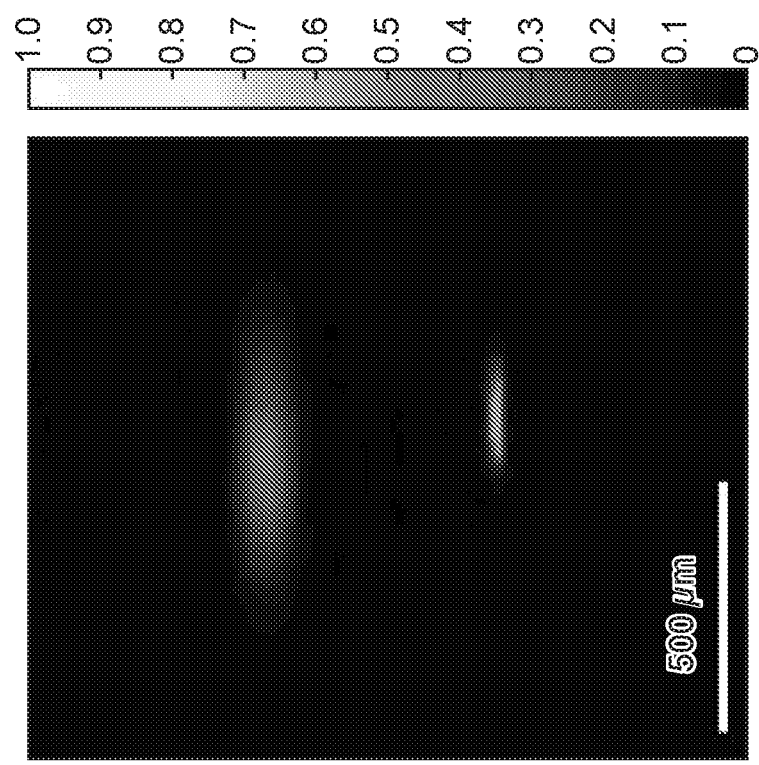
FIG. 10. Camera images of focal spots produced under illumination from a supercontinuum laser with bandwidths of about 5 nm after passing through a linear polarizer, at center wavelength of (a) about 532 nm and (b) about 660 nm. In (a) the focal spots of meta-lens with NA=about 0.1 (top) and NA=about 0.022 (bottom) originate from meta-lenses of R1 and R2, respectively. In (b) both focal spots belong to the low NA meta-lens (with opposite helicities: R2 and L2) since the focal spots from the high NA lens are no longer visible due to their operating range.
Figure 10A:
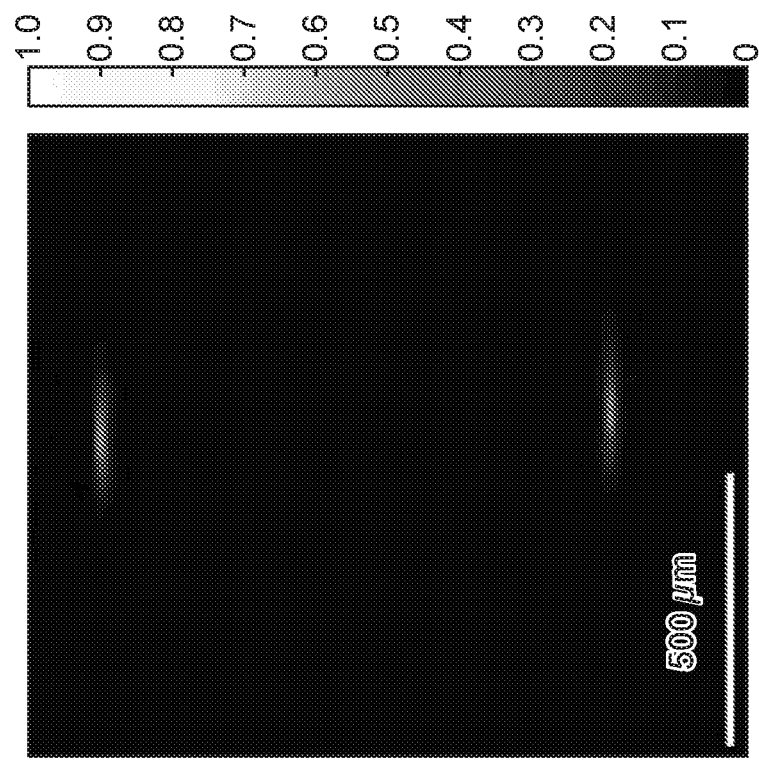
Figure 11:
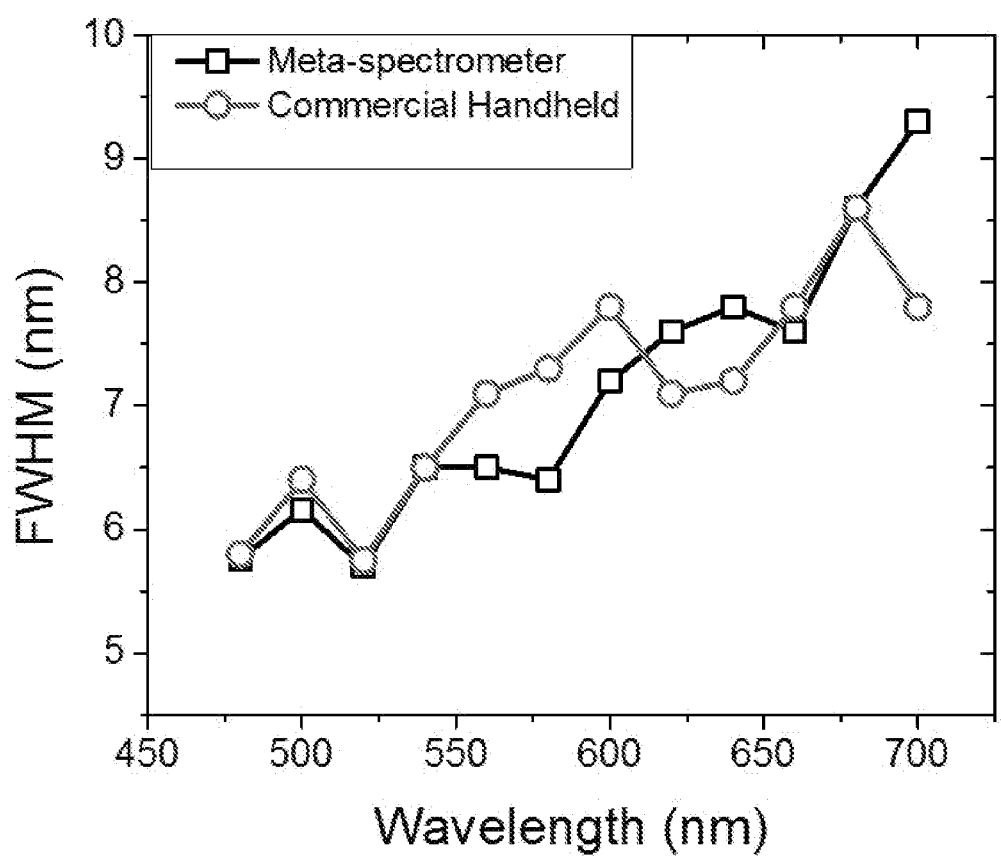
FIG. 11. Full-width half maximum (FWHM) of input light from a supercontinuum laser, as measured by a meta-lens spectrometer (squares) and a commercial handheld system (circles). It can be seen that the meta-lens spectrometer offers comparable or better performance within the range about 480 nm-about 660 nm, as simulated and presented in FIG. 5(a)-(d). Above about 660 nm the FWHM increases rapidly and becomes less accurate due to aberrations in the focal spots.
Figure 12A:
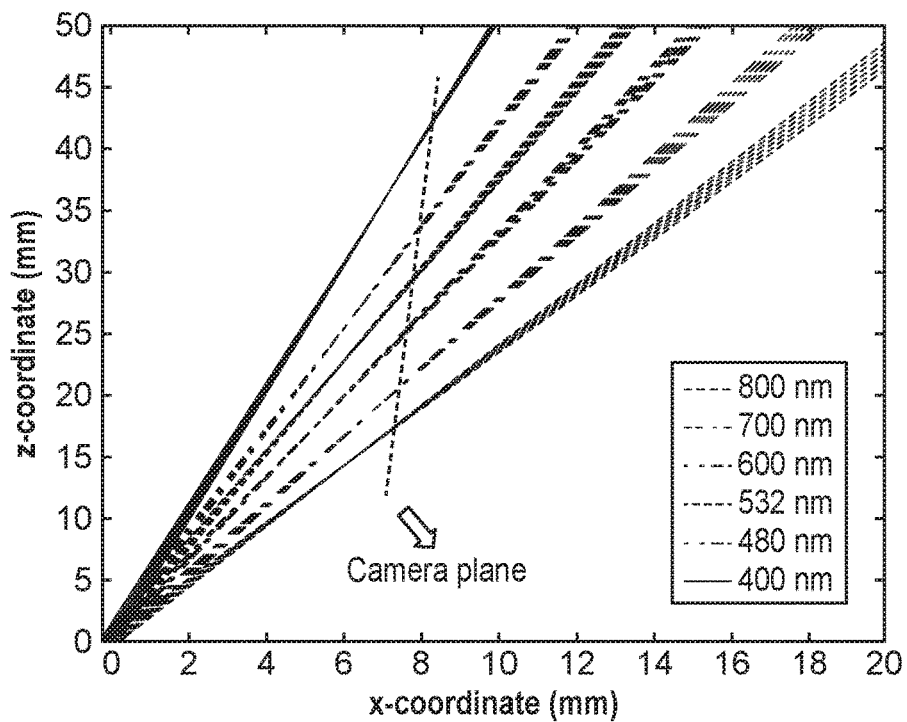
FIG. 12. (a) Simulated ray tracing plot of a meta-lens designed for a camera with larger active region (Hamamatsu S10141-1108S) capable of an even larger spectral range throughout the visible (400-800 nm). This lens has a focal length of about 30 mm, NA=about 0.008 with a focusing angle of about 15°. It possesses an intrinsic resolution of about 0.48 nm; together with the detector-constrained resolution of about 0.55 nm, a spectrometer using this meta-lens can have a resolution of about 1 nm. This value and spectral range of operation is comparable to other compact spectrometers which possess significantly longer beam propagation lengths. (b)-(g) Calculated spot diagrams showing that the focal spots throughout the visible range are contained within the diffraction limited Airy disk (black ellipse). The elliptical Airy disk results from the rectangular shape of the lens (about 500 µm×about 800 µm).
Figure 12B:
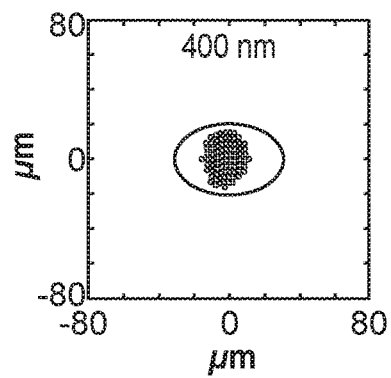
Figure 12C:
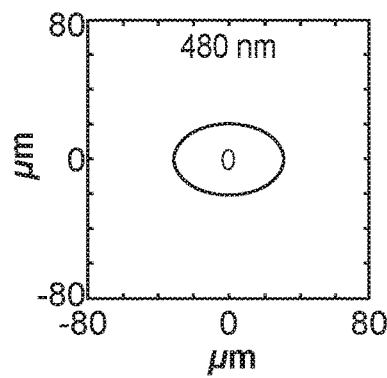
Figure 12D:
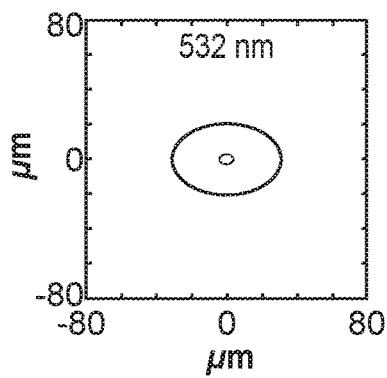
Figure 12E:
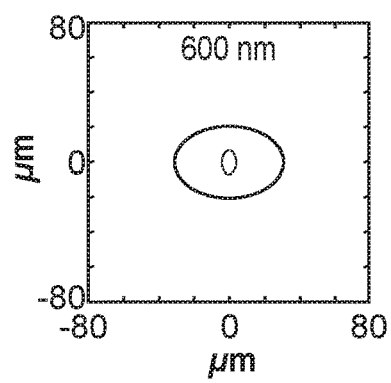
Figure 12F:
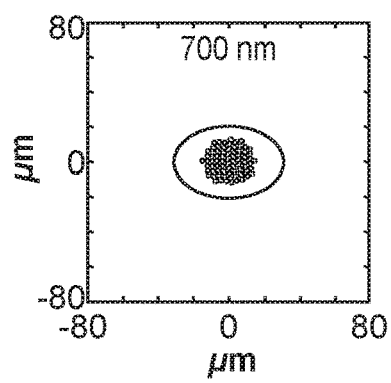
Figure 12G:
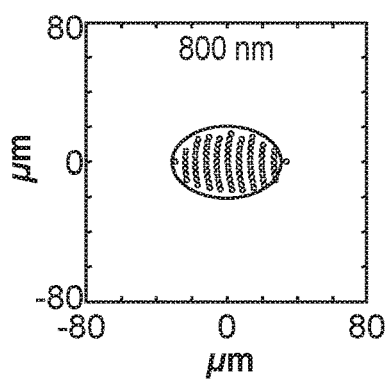

Subsequently, a supercontinuum laser (SuperK Varia, NKT photonics) is used with its bandwidth set to about 5 nm for wavelengths ranging from about 480 nm to about 780 nm in steps of 10 nm to characterize the performance of the meta-spectrometer and compare it against that of a commercial handheld spectrometer (OceanOptics USB4000 UV-VIS). The center wavelengths of the supercontinuum laser input are used to calibrate the system and account for the slight non-linear dispersive effects across this broad wavelength range (FIG. 9). FIG. 5(e)-(f) illustrates the measured spectrum by the meta-spectrometer and the commercial spectrometer, respectively. Camera images of the focal spots are shown in FIG. 10. Close to identical spectral lineshapes are observed with FWHM of about 5-6 nm across the visible spectrum. This validates the operating range of the low NA meta-lenses; additionally, no observation is made of any significant linewidth broadening effects with the increase in wavelength within the previously specified operating wavelength range from about 470 nm-about 660 nm. Beyond this range, due to aberrations in the focal spots one can observe a significant, consistent increase in FWHM which is larger than the commercial system (FIG. 11). This is in good agreement with the previously discussed theoretical results in FIG. 5(b)-(d). These results also offer further evidence that by a proper design a planar meta-lens can achieve comparable or even superior performance to traditional lenses.

Next the dispersion and thus the spectral resolution of the meta-spectrometer are quantified. FIG. 5(g) plots the measured peak intensity positions of the focal spots as a function of wavelength for both high and low NA meta-lenses about their design wavelength of about 532 nm. These dispersion values are calculated by tracking the change in these positions as the wavelength is varied with higher precision in steps of about 1 nm. As expected and consistent with the earlier calibration results in FIG. 9, the observed dispersions are approximately linear within a range of about 30-40 nm. Their values are found to be about 59 µm/nm and about 24 µm/nm for meta-lenses with NA of about 0.1 and about 0.022, respectively. Using Eq. (3), the intrinsic experimental spectral resolution achievable is determined to be about 0.05 nm and about 0.46 nm for meta-lenses with corresponding NAs of about 0.1 and about 0.022. In practice for this meta-lens spectrometer, the spectral resolution is constrained by the pixel size of the camera (about 5.2 µm); the detector-constrained attainable spectral resolution therefore becomes (Eq. (4)) about 0.31 nm and about 1.11 nm respectively. It is noted that the values achieved here are a proof of concept, given various experimental constraints. In principle, by using a suitable camera with a larger active region, one can significantly improve the operating range while retaining high spectral resolution. As an example, it is possible to design meta-lenses of similar sizes (R2 and L2 in FIG. 3) with a spectral range covering the entire visible range (400-800 nm) where all the focal spots lie within their respective diffraction limited Airy disk. Further details and simulated results are presented in FIG. 12.

Polarization Information

Finally characterization is made of the CP resolving capability of the meta-spectrometer. A complete description of any arbitrary polarization state can be made using the Stokes parameters $S_0$, $S_1$, $S_2$, and $S_3$ which correspond to the intensities of incident, vertically polarized, 45° polarized and circularly polarized light respectively. Here, this discussion focuses on S3 because the chiral optical response (circular dichroism) of most materials is weak compared to its linear counterpart. Furthermore, typical approaches to measuring S3 as a function of wavelength using a single planar device is challenging due to separating light in both spectral and polarization domains. Although various nanostructures can behave as miniaturized CP filters, they typically lack the ability to resolve spectral information. By using the off-axis meta-lenses based on rotated nanofins, the resulting phase profile focuses one helicity while defocusing the other. This functionality thus allows resolving the chirality of incident light in a single measurement by having two separate meta-lenses to focus RCP and LCP on the same chip.

Figures 6A, 6B:
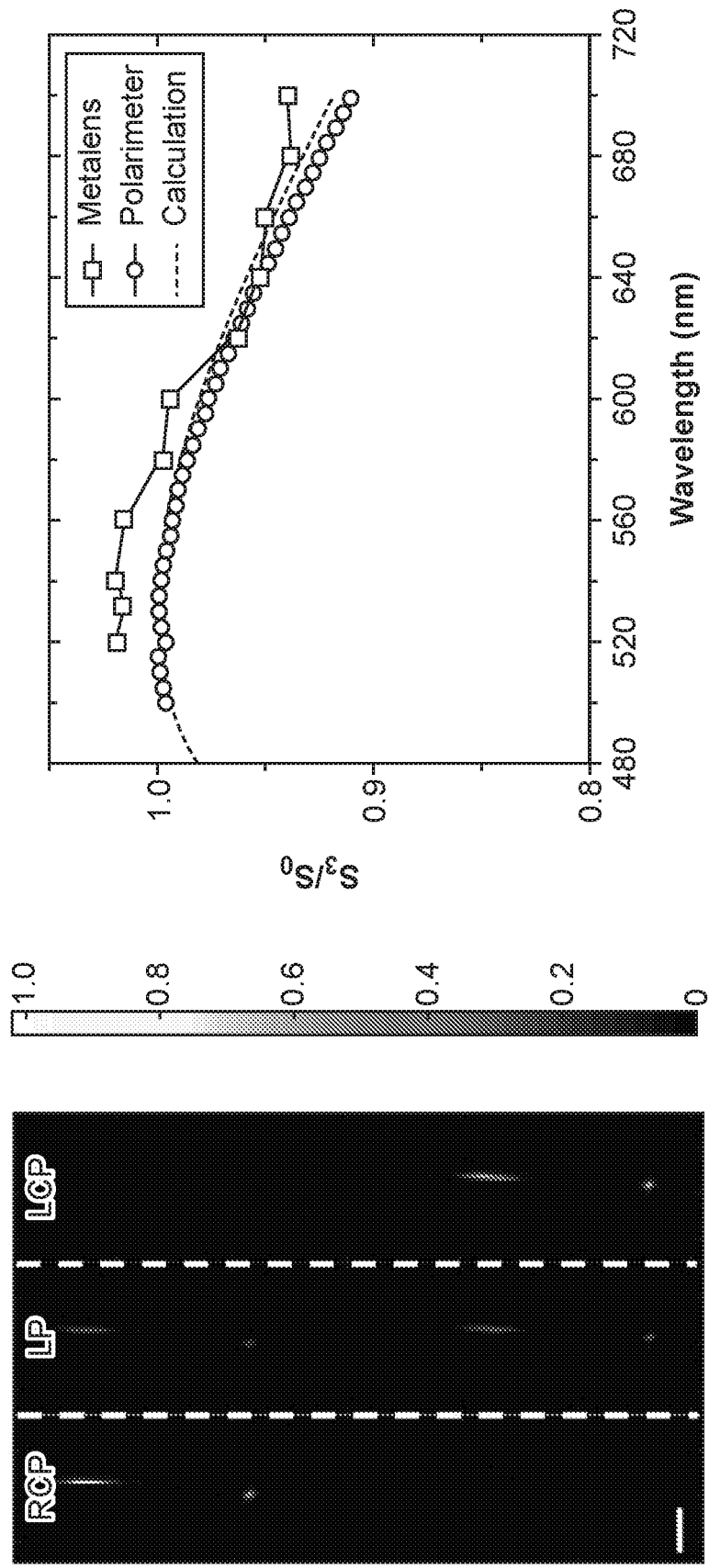
FIG. 6. (a) Stitched camera images of focal spots from meta-lenses for right circular polarized (RCP), linearly polarized (LP), and left circularly polarized (LCP) incident light. Intensities are normalized to the same shading scale and the illumination wavelength was about 532 nm. The intensities of the RCP and LCP spots are observed to be slightly different due to fabrication imperfections as they are focused by different meta-lenses. Scale bar: 100 μm. (b). Normalized $S_3/S_0$ Stokes parameter as a function of wavelength measured by a meta-spectrometer, a commercial polarimeter and theoretical calculation from waveplate retardance.

FIG. 6(a) illustrates the variations in intensities of the focal spots upon changing incident light polarization (from RCP to linear to LCP). Differences in the intensities of the focal spots for RCP and LCP light arise from fabrication errors since they originate from different meta-lenses (R1 and L1 versus R2 and L2, as shown in FIG. 3(b)). To control the polarization of the incident light, a polarizer (Thorlabs GTH10) and a zero-order single wavelength (about 532 nm) quarter waveplate (Thorlabs WPQ05M-532) are placed in the collimated beam path right before the meta-lenses. Next, various $S_3$ Stokes parameters (normalized to incident light intensity $S_0$) are obtained at different wavelengths using the meta-lenses and compared to the results of a commercial polarimeter and analytical calculations (FIG. 6(b)). These various elliptically polarized states at different wavelengths are generated by changing the wavelength of input light (SuperK Varia). Due to the deviation in optical retardance of the single wavelength (about 532 nm) quarter waveplate (characterized and provided by Thorlabs), various elliptical polarization states can be generated across a broad range in the visible. Measured values upon appropriate calibration are seen to be in good agreement with both the values measured by a commercial polarimeter (Thorlabs TXP) and analytical predictions based on retardance data. For wavelengths close to $\lambda$=about 532 nm where the retardance of the waveplate is almost exactly $\lambda/4$, the measured values are slightly greater than unity (about 1.01) likely due to experimental noise (e.g., pixel noise from the camera) in the measurements. Details of these calculations are provided in Methods. Although here $S_3/S_0$ is obtained due to the chiral response of the meta-lenses designed with the geometric phase, in principle by adding linear grating components the full Stokes parameters can be resolved.

Aberration Corrected Spectroscopy

One of the challenges of spectrometers is a curved focal plane due to a lens, which results in aberrated focal spots and thus constrains resolution and working spectral range. This is applicable for both conventional and meta-lens spectrometers. Here, by simultaneously engineering phase and group delay at the design wavelength, demonstration is made of an aberration corrected meta-lens (AML) capable of focusing light of different wavelengths onto a same flat focal plane. Thereby a resulting spectrometer is diffraction limited for a significantly larger bandwidth of operation, and is a metasurfaces analog of an aberration corrected spectrometer.

FIG. 7(a) shows a presentative schematic of an AML. The layout of a top-right quadrant of the AML is shown in FIG. 7(b). The constituent element is shown in FIG. 7(c), comprised of one or two rectangular nanofins 700 and 702 within an about 400×400 nm² area, and multiples ones of such constituent element are disposed on a substrate 704. Each nanofin 700 or 702 has a height of about 600 nm, and a gap between the nanofins 700 and 702 is a substantially constant value of about 60 nm. Similar to the previously illustrated cases, the optical properties of nanofins 700 and 702 can be understood as truncated waveguides, which can be tuned by varying their length (l) and width (w). The AML is designed such that it can achieve an off-axis and aberration corrected focal spot on the x-z plane. The following phase profile of the meta-lens calculated by ray-tracing should satisfy:

$$\varphi(x, y, \omega) = \frac{\omega}{c}\left(\sqrt{(x - x_f)^2 + y^2 + (z - z_f)^2} - f(\omega)\right) \quad (5)$$

where x and y are spatial coordinates, and $\omega$ and c are the angular frequency and speed of light, respectively. The focal length $f(\omega)$ and its corresponding $x_f$ and $z_f$ coordinates are related to the focusing angle $\theta$ by:

$$x_f = f(\omega) \cdot \sin(\theta(\omega)) \quad (6)$$

$$z_f = f(\omega) \cdot \cos(\theta(\omega)) \quad (7)$$

The dispersion property of the focal length and the focusing angle are designed corresponding to the intrinsic dispersive properties of diffractive lenses and gratings:

$$f(\omega) = \frac{\omega}{\omega_d} f_d \quad (8)$$

$$\sin(\theta(\omega)) = \frac{\omega_d}{\omega} \sin(\theta_d) \quad (9)$$

where $\omega_d$ corresponds to the angular frequency of the design wavelength $\lambda_d$=about 530 nm. Note that Eq. 8 and Eq. 9 result in a constant x-coordinate of focal spots ($x_f$) for different wavelengths, ensuring that the focal spots lie on a single plane.

Eq. 5 can be Taylor-expanded at the design wavelength $\lambda_d$=530 nm corresponding to the angular frequency $\omega_d$:

$$\varphi(x, y, \omega) = \varphi(x, y, \omega_d) + \frac{\partial \varphi}{\partial \omega} \cdot (\omega - \omega_d) + \cdots \quad (10)$$

Figure 8A:
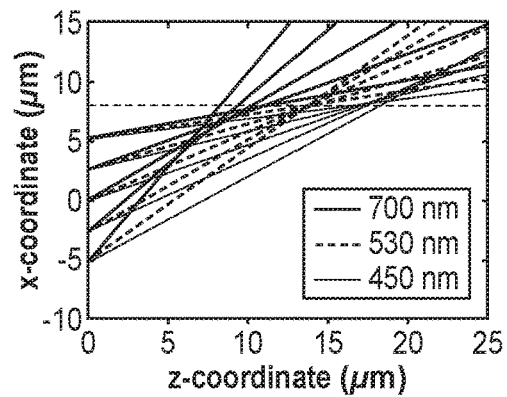
FIG. 8. (a) Ray-tracing and (b), (c) focal spot diagrams of a regular (no aberration correction) meta-lens. (d)-(f) Results of an AML. (g) Results from a full-wave finite-difference time-domain (FDTD) simulation, indicating that focal spots from different wavelengths lie on the same plane (straight line in y-z space). (h) Cross sections of the focal spots at different wavelengths, demonstrating diffraction limited focusing throughout this spectral range.
Figure 8B:
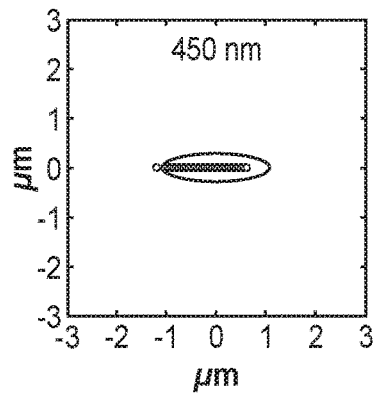
Figure 8C:
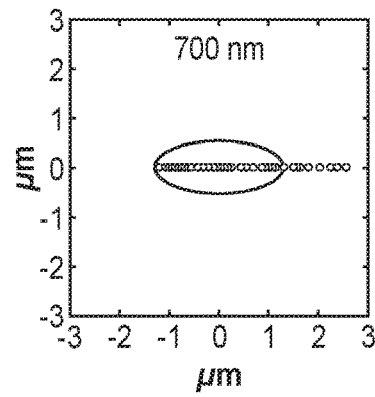
Figure 8D:
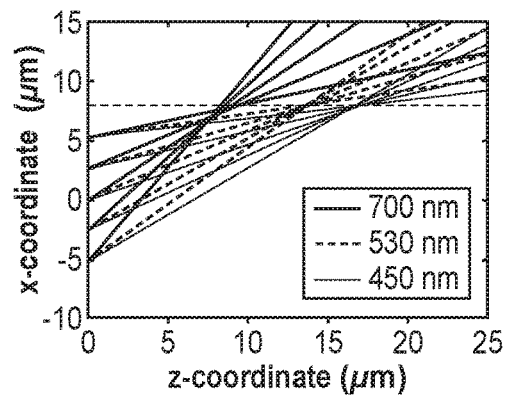
Figure 8E:
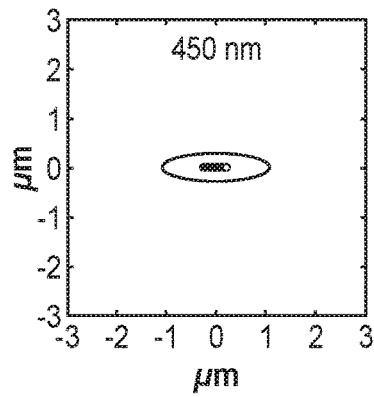
Figure 8F:
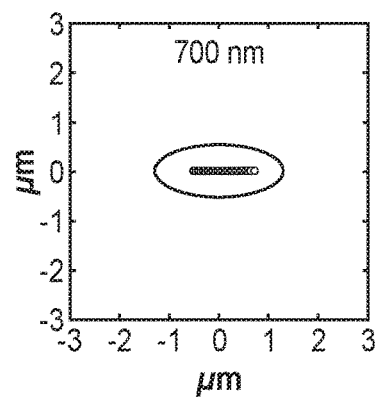
Figure 8G:
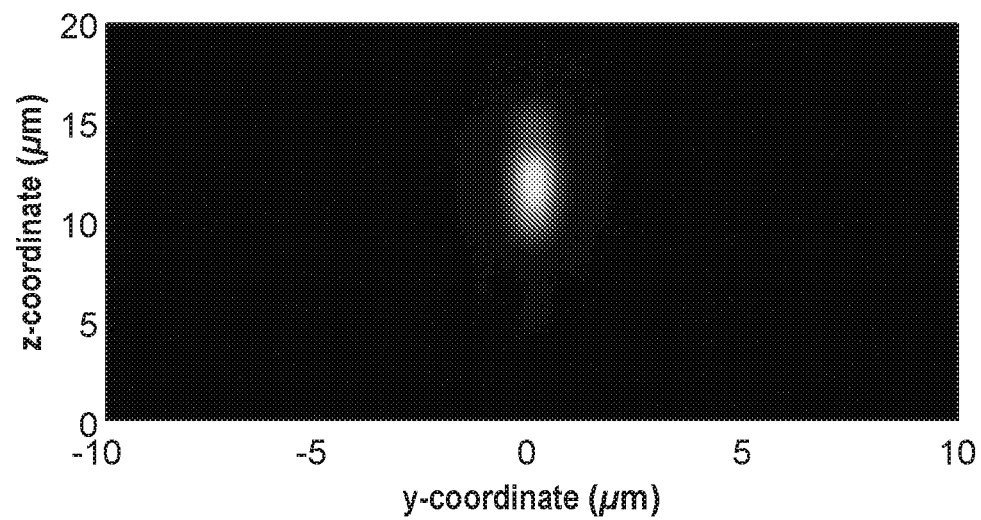
Figure 8H:
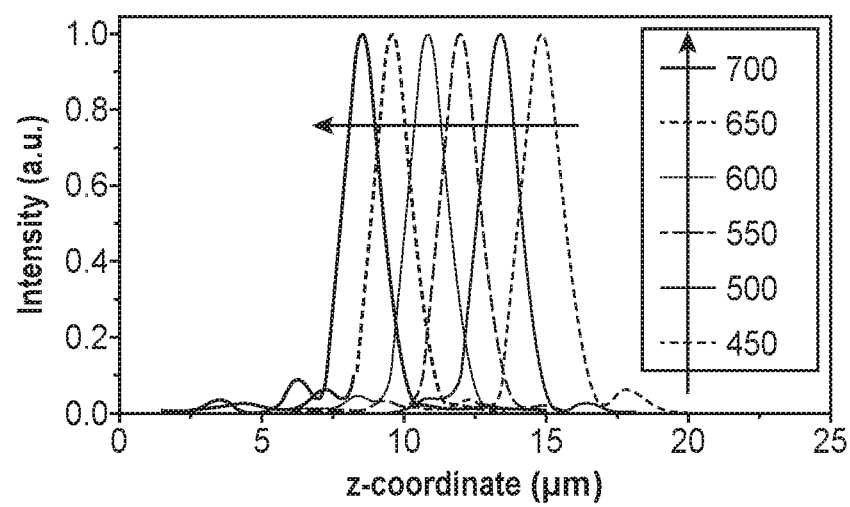

The partial derivative of the second term $$\left(\frac{\partial \varphi}{\partial \omega}\right)$$

is the group delay. FIG. 8(a) shows the ray-tracing calculation for an off-axis focusing meta-lens without correcting aberrations. This corresponds to a constant phase profile for different wavelengths given by the first term of Eq. 10. Its intersection points on an image plane (depicted by a dashed black line) are shown in FIG. 8(b)-(c) for wavelength $\lambda$=450 nm and 700 nm, respectively. The rays do not intersect at the same point, and the focal planes for different wavelengths are curved. This leads to aberrations such as stigmatism. Although one can tilt the image plane to reduce the spread of intersected points on the image plane, this introduces difficulty in alignment and becomes unfeasible for high spectral resolution cases. FIG. 8(d)-(f) show a similar analysis for the AML, which as mentioned previously satisfy the first two terms of Eq. 10. This was realized by placing a constituent element with a specified group delay at a given coordinate, followed by rotating it to impart a specified (geometric) phase. The group delays of constituent elements are tuned by changing the length and width of nanofins. The range of group delay covered by all constituent elements eventually determines the size of the AML. In a height of about 600 nm, the AML can achieve about 3 femto-second group delay coverage. This can be increased by using a material with a higher refractive index, or varying the height of nanostructures, which can be manufactured with twophoton polymerization. Although the high-order terms are neglected (group delay dispersion and so forth), the resultant focal spots can still be close to diffraction-limited since the NA of the AML is low. FIG. 8(g) shows FDTD-simulated results corresponding to the ray-tracing calculation in FIG. 8(d): each wavelength is focused on the yz-plane. FIG. 8(h) shows intensity profiles of a few wavelengths in FIG. 8(g).

CONCLUSION

In summary for some embodiments, an ultra-compact meta-lens spectrometer is demonstrated based on integrating multiple planar off-axis meta-lenses at visible wavelengths. This has several advantages over its grating based counterparts: firstly, it combines the functions of a focusing and dispersive component in a single planar structure, which eliminates the need for rotating turrets or focusing mirrors. Secondly, in terms of performance it surpasses conventional blazed grating components as one can achieve extremely large dispersions which are otherwise unattainable. In addition, the integration of several meta-lenses with different NAs on one substrate allows for multiple different spectral resolutions and a flexible operating wavelength range with no further increase in system bulk or complexity. Finally, the meta-lenses can provide additional information about the chirality of incident light, which is not attainable for typical devices without the use of additional optical components (e.g., polarizer and waveplates). The use of dielectric $TiO_2$ as the working material also renders it compatible with CMOS processes where large scale production could take place in a single lithographic stage or be monolithically integrated with sensor technologies. Numerous potential applications include those in health care, environmental sensing and related areas for this technology.

Methods

Calculation of Stokes parameter $S_3/S_0$. The calculation of the normalized Stokes parameter for circularly polarized light, $S_3/S_0$, under incident light of an unknown polarization state should be calibrated against a spectrometer response for a perfect CP state. However due to waveplate imperfections, typically one obtains an elliptical near-CP state (ENCS) instead. This problem can be resolved by performing two successive calibration measurements using an (imperfect) achromatic quarter waveplate and linear polarizer aligned about 45° with respect to each other, where both the waveplate and polarizer are rotated together by about 90° in the second measurement. In this case the averaged intensity ($I_{av}$) from the two measurements can be shown to correspond to the response obtained from a perfect CP state:

$$I_{av} = (I_{ENCS} + I_{ENCS+90°})/2$$

where $I_{ENCS}$ and $I_{ENCS+90°}$ are the directly measured intensities of the elliptical near-CP states. The intensities are obtained by a summation of their corresponding focal spots captured by the camera. The normalized $S_{3\text{-}cal}$ then given by the expression:

$$S_{3\text{-}cal} = \frac{I_{av-RCP} - I_{av-LCP}}{I_{av-RCP} + I_{av-LCP}}$$

where $I_{av-RCP}$ and $I_{av-LCP}$ are the responses corresponding to the case of RCP or LCP incidence. These $S_{3\text{-}cal}$ are obtained for wavelengths from about 520 nm to about 700 nm; they then act as calibration values for the meta-spectrometer. Subsequently, an about 532 nm zero-order quarter waveplate is placed after a linear polarizer with their axes aligned about 45° with respect to each other. The zero-order quarter waveplate generates elliptical states corresponding to different values of $S_3$ for various wavelengths due to non-quarter wave retardance at these wavelengths away from 532 nm. The $S_3$ values are then obtained by measuring the intensity difference of focused LCP and RCP light divided by their intensity summation:

$$S_3 = \frac{I_{RCP} - I_{LCP}}{I_{RCP} + I_{LCP}}$$

The final calibrated values shown in FIG. 6(b) were obtained by $S_3/S_{3\text{-}cal}$ at their corresponding wavelength.

EXAMPLE EMBODIMENTS

In some embodiments, an optical device includes a substrate and multiple meta-lenses disposed on the substrate, each of the meta-lenses including multiple nanostructures in the form of nanofins disposed or fabricated on a respective region of the substrate, the nanofins of each of the meta-lenses together specifying a phase profile of the meta-lens such that a wavelength and a polarization of an incident beam are decomposed and focused off-axis on different areas of an active region of a camera.

In some embodiments, a cross-section of at least one nanofin is rectangular (see FIG. 1(a)).

Figure 13:
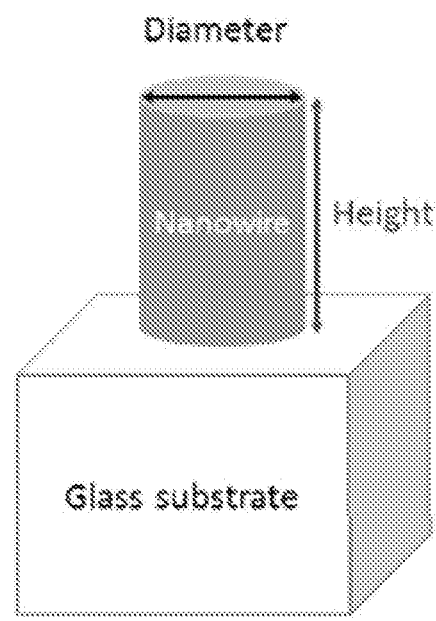
FIG. 13. Schematic of a single nanofin with a height and a diameter on a glass substrate.

In some embodiments, a cross-section of at least one nanofin is elliptical or circular (see FIG. 13).

In some embodiments, at least some of neighboring nanofins are oriented at different angles. In some embodiments, a cross-section of nanofins can have a 2-fold rotational symmetry, or more generally, an n-fold rotational symmetry where n is an integer that is 2 or greater than 2. In some embodiments, a first nanofin can be substantially aligned with a selected axis (e.g., a rotation of the first nanofin is zero), and a second nanofin can be rotated with respect to the selected axis and with respect to the first nanofin by a non-zero angle that is at least about ±5°, at least about ±10°, at least about ±15°, or at least about ±20°.

In some embodiments, the meta-lenses are composed of a semiconductor, an oxide (e.g., a metal or non-metal oxide), a nitride (e.g., a metal or non-metal nitride), a sulfide (e.g., a metal or non-metal sulfide), a pure element, or a combination of two or more of these.

In some embodiments, at least two of the meta-lenses have different numerical apertures.

In some embodiments, at least two of the meta-lenses have different off-axis focusing angles.

In some embodiments, at least two of the meta-lenses have different focal lengths.

In some embodiments, at least two of the meta-lenses are configured to focus light having different polarization states (e.g., different helicities).

In some embodiments, for each of the meta-lenses, a phase profile is achieved by positioning each nanofin on the substrate with a geometric rotation according to Pancharatnam-Berry phase. In other embodiments, the phase profile may be achieved by varying geometric dimensions of the nanofins.

In some embodiments, the substrate is transparent in the visible spectrum, such as a glass substrate or one including fused silica. Suitable substrates that are transparent in the visible spectrum can have a light transmittance of at least about 40%, at least about 50%, at least about 60%, at least about 70%, at least about 80%, at least about 85%, at least about 90%, or at least about 95%, over the visible spectrum or a design or working wavelength in the visible spectrum.

In some embodiments, the nanofins include a dielectric material. Examples of suitable dielectric materials include metal and non-metal oxides (such as an oxide of aluminum (e.g., $Al_2O_3$), silicon (e.g., $SiO_2$), hafnium (e.g., $HfO_2$), zinc (e.g., ZnO), magnesium (e.g., MgO), or titanium (e.g., $TiO_2$)), metal and non-metal nitrides (such as nitrides of silicon (e.g., $Si_3N_4$), boron (e.g., BN), or tungsten (e.g., WN)), metal and non-metal sulfides, and pure elements (e.g., silicon for operation at near-infrared and mid-infrared wavelengths).

In some embodiments, the nanofins have aspect ratios (e.g., height:width) greater than about one, such as at least about 1.5:1, at least about 2:1, at least about 3:1, at least about 4:1, or at least about 5:1, and up to about 10:1 or greater, or up to about 20:1 or greater. In some embodiments, geometric dimensions (e.g., height/width/length or diameter/height) of the nanofins are sub-wavelength, such as about 800 nm or less, about 700 nm or less, or about 600 nm or less.

In some embodiments, an aberration corrected optical device includes a substrate and at least one meta-lens disposed on the substrate, the meta-lens including multiple constituent dielectric elements disposed or fabricated on the substrate, the constituent elements together specifying a phase profile and a group delay of the meta-lens such that different wavelengths of an incident beam are focused off-axis on a common image plane. In some embodiments, the image plane corresponds to an active region of a camera.

In some embodiments, the different wavelengths encompass a range of wavelengths of about 50 nm or greater, about 100 nm or greater, about 150 nm or greater, or about 200 nm or greater.

In some embodiments, each constituent dielectric element includes multiple (e.g., two) nanostructures in the form of nanofins spaced apart by a gap.

In some embodiments, the nanofins of each constituent dielectric element have geometric dimensions along a first axis that are substantially the same, and have geometric dimensions along a second axis (which is orthogonal to the first axis) that are different.

In some embodiments, the nanofins of each constituent dielectric element have heights that are substantially the same, and have cross-section areas that are different.

In some embodiments, the nanofins of each constituent dielectric element are oriented at angles that are substantially the same. In some embodiments, at least some of neighboring dielectric elements are oriented at different angles. In some embodiments, the nanofins of a first dielectric element can be substantially aligned with a selected axis (e.g., a rotation of the first dielectric element is zero), and the nanofins of a second dielectric element can be rotated with respect to the selected axis and with respect to the first dielectric element by a non-zero angle that is at least about ±5°, at least about ±10°, at least about ±15°, or at least about ±20°.

In some embodiments, a spectro-polarimeter or a meta-spectrometer includes any of the foregoing optical devices and a camera adjacent to the optical device. In some embodiments, the spectro-polarimeter is configured to measure polarization and spectral information of an incident beam in a (single) snapshot of the camera.

The device of some embodiments of this disclosure can be designed to operate for wavelengths outside the visible range, such as in the near-infrared, mid-infrared and/or far-infrared range. In some embodiments, the nanofins comprise silicon, amorphous silicon, gallium phosphide, or two or more of these. Such materials may have negligible material loss in the near-infrared, mid-infrared and far-infrared ranges and therefore may be suitable for meta-spectrometers in these wavelength ranges.

The device of some embodiments of this disclosure can also be used for simultaneously measuring all Stokes parameters ($S_0$, $S_1$, $S_2$, and $S_3$) and wavelength of an input beam in a single measurement.

The device of some embodiments of this disclosure can be extended to perform multi-spectral imaging.

The device of some embodiments of this disclosure can be extended to perform polarization resolved imaging.

The device of some embodiments of this disclosure can be fabricated through a fabrication process using atomic layer deposition (ALD) that provides for the formation of high efficiency metasurfaces having the desirable characteristics disclosed herein in various embodiments of the present disclosure. The fabrication process may implement cleanroom process operations such as lithography and reactive ion etching, reproducibly providing deep sub-wavelength dielectric elements with desired geometries and low loss in the visible spectrum or other desired spectrum. In some embodiments, ALD is performed to deposit a film of a dielectric material over a patterned resist layer and portions of a surface of a substrate exposed by openings in the patterned resist layer. Additional details of the fabrication process can be found in, for example, International Patent Application Publication No. WO 2017/091738, published Jun. 1, 2017, the contents of which are incorporated herein by reference in their entireties.

As used herein, the singular terms "a," "an," and "the" may include plural referents unless the context clearly dictates otherwise.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical device comprising:
a substrate; and
multiple meta-lenses disposed on the substrate, each meta-lens of the meta-lenses including multiple nanofins disposed on a respective region of the substrate, the multiple nanofins of each meta-lens together specifying a phase profile of the respective meta-lens.

2. The optical device of claim 1, wherein at least two of the meta-lenses have different numerical apertures.

3. The optical device of claim 1, wherein at least two of the meta-lenses have different off-axis focusing angles.

4. The optical device of claim 1, wherein at least two of the meta-lenses have different focal lengths.

5. The optical device of claim 1, wherein at least two of the meta-lenses are configured to focus light having different polarization states.

6. The optical device of claim 1, wherein, for each meta-lens of the meta-lenses, the phase profile is achieved by positioning each nanofin on the substrate with a geometric rotation according to Pancharatnam-Berry phase.

7. The optical device of claim 1, wherein a cross-section of at least one nanofin is rectangular.

8. The optical device of claim 1, wherein a cross-section of at least one nanofin is elliptical.

9. The optical device of claim 1, wherein the meta-lenses include an oxide, a nitride, a sulfide, a pure element, or a combination of two or more thereof.

10. A spectro-polarimeter comprising:
the optical device of claim 1; and
a camera adjacent to the optical device.

11. The spectro-polarimeter of claim 10, configured to measure polarization and spectral information of an incident beam in a snapshot of the camera.

12. An optical device comprising:
a substrate; and
a plurality of meta-lenses disposed on the substrate, each of the plurality of meta-lenses including multiple dielectric elements disposed on the substrate, the dielectric elements of each of the plurality of meta-lenses together specifying a phase profile and a group delay of the respective meta-lens such that different wavelengths of an incident beam are focused off-axis on a common image plane.

13. The optical device of claim 12, wherein each of the dielectric elements includes two nanofins spaced apart by a gap.

14. The optical device of claim 13, wherein the two nanofins have geometric dimensions along a first axis that are substantially the same, and have geometric dimensions along a second axis that are different, wherein the second axis is orthogonal to the first axis.

15. The optical device of claim 13, wherein the two nanofins have heights that are substantially the same, and have cross-section areas that are different.

16. The optical device of claim 12, wherein the different wavelengths encompass a range of wavelengths of 50 nm or greater.

17. A spectro-polarimeter comprising:
the optical device of claim 12; and
a camera adjacent to the optical device.

18. The spectro-polarimeter of claim 17, configured to measure polarization and spectral information of an incident beam in a snapshot of the camera.

* * * * *